(12) United States Patent
Itoh et al.

(10) Patent No.: US 9,225,257 B2
(45) Date of Patent: Dec. 29, 2015

(54) POWER SUPPLY CIRCUIT

(71) Applicant: Panasonic Corporation, Osaka (JP)

(72) Inventors: Kazuhiko Itoh, Osaka (JP); Masanobu Murakami, Osaka (JP); Kazushige Sugita, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 23 days.

(21) Appl. No.: 14/376,900

(22) PCT Filed: Oct. 23, 2012

(86) PCT No.: PCT/JP2012/006789
§ 371 (c)(1),
(2) Date: Aug. 6, 2014

(87) PCT Pub. No.: WO2013/118207
PCT Pub. Date: Aug. 15, 2013

(65) Prior Publication Data
US 2015/0303823 A1    Oct. 22, 2015

(30) Foreign Application Priority Data

Feb. 9, 2012  (JP) ................................. 2012-026050

(51) Int. Cl.
*H02M 7/06* (2006.01)
*H02M 3/156* (2006.01)
(Continued)

(52) U.S. Cl.
CPC *H02M 7/06* (2013.01); *H02M 1/14* (2013.01); *H02M 1/42* (2013.01); *H02M 3/1563* (2013.01); *H02M 7/217* (2013.01); *H05B 33/0815* (2013.01)

(58) Field of Classification Search
CPC ..................... H02M 3/33523; H02M 3/33507; H02M 3/33569; H02M 1/32; H02M 1/4208; H02M 7/48; Y02B 70/126

USPC ................. 363/16, 56.01, 74, 78, 95, 97, 131
See application file for complete search history.

(56) References Cited

U.S. PATENT DOCUMENTS 4,763,235 A * 8/1988 Morita .............. H02M 3/33507
363/19
4,973,896 A * 11/1990 Shiga .................... H02J 7/1438
290/40 C (Continued)

FOREIGN PATENT DOCUMENTS

JP      55-014264 U     7/1978
JP      2005-294063 A   10/2005
(Continued)

OTHER PUBLICATIONS

International Search Report for corresponding International Application No. PCT/JP2012/006789 mailed Jan. 29, 2013.
(Continued)

*Primary Examiner* — Adolf Berhane
(74) *Attorney, Agent, or Firm* — Renner, Otto, Boisselle & Sklar, LLP

(57) ABSTRACT

A power supply circuit (1) including: rectifying and smoothing circuit (31); transistor (switching element) (37) connected to an output terminal of the rectifying and smoothing circuit (31); transformer (TF1) including primary coil (L36) connected to the transistor (37) and secondary coil (L47) magnetically coupled with the primary coil (L36); current detector circuit (41) detecting current flowing through the transistor (37), and outputting voltage corresponding to the current; voltage output circuit (44) outputting, while the transistor (37) is in a turned-on state, voltage dependent on voltage induced by the secondary coil (L47); and on-off control circuit (57) turning off the transistor (37) when absolute value (Vbe) of a difference between the voltage from the current detector circuit (41) and the voltage from the voltage output circuit (44) is no smaller than threshold voltage (Von), and turning on the transistor (37) when the absolute value (Vbe) is smaller than the threshold voltage (Von).

7 Claims, 13 Drawing Sheets

(51) Int. Cl.
*H02M 1/14* (2006.01)
*H02M 1/42* (2007.01)
*H02M 7/217* (2006.01)
*H05B 33/08* (2006.01)

(56) References Cited

U.S. PATENT DOCUMENTS

| | | | | |
|---|---|---|---|---|
| 6,842,353 | B2* | 1/2005 | Yamada | H02M 1/36 323/271 |
| 7,035,119 | B2* | 4/2006 | Koike | H02M 3/33523 363/19 |
| 8,513,926 | B2* | 8/2013 | Park | G05F 1/70 323/207 |
| 2003/0048644 | A1* | 3/2003 | Nagai | H02M 3/33592 363/21.09 |
| 2005/0269968 | A1* | 12/2005 | Ito | H05B 33/0815 315/282 |
| 2007/0247520 | A1* | 10/2007 | Lhermite | H02M 3/3385 348/43 |
| 2011/0050129 | A1 | 3/2011 | Rudolph | |
| 2011/0248637 | A1 | 10/2011 | Mitsuyasu et al. | |
| 2012/0133295 | A1 | 5/2012 | Pereira et al. | |
| 2012/0230715 | A1* | 9/2012 | Ogino | G03G 15/1675 399/66 |
| 2013/0308347 | A1* | 11/2013 | Sato | H02M 3/337 363/21.03 |

FOREIGN PATENT DOCUMENTS

| | | |
|---|---|---|
| JP | 2011-510604 A | 3/2011 |
| JP | 2011-090901 A | 5/2011 |
| JP | 2011-120354 A | 6/2011 |
| WO | WO 2010/118944 A1 | 10/2010 |

OTHER PUBLICATIONS

Form PCT/ISA/237 for corresponding International Application No. PCT/JP2012/006789 mailed Jan. 29, 2013.
Extended European Search Report for corresponding European Application No. 12867827.3 dated Jun. 18, 2015.

* cited by examiner 48, 52, 37

49

POWER SUPPLY CIRCUIT

TECHNICAL FIELD

The present invention relates to a power supply circuit, and particularly to technology of reducing power loss in a circuit.

BACKGROUND ART

In recent years, light emission efficiency of light-emitting diodes (LEDs) has improved to such an extent that LEDs are attracting attention as a light source for general illumination use. In order to drive LEDs, a DC power supply is required. As a conventional DC power supply, a power supply circuit having a voltage step-down circuit has been proposed (Patent Literature 1). The voltage step-down circuit reduces the voltage supplied from an AC power supply by rectification and smoothing using a switching element, and outputs the voltage thus reduced.

In general, such a power supply circuit performs control for suppressing the current flowing through the LEDs such that the current does not exceed a predetermined current value, thereby enabling the LEDs to emit light in a stable state. When such control is required, the power supply circuit is generally provided with a current detection resistor for detecting the current flowing through the LEDs and a fixed-voltage supply using a Zener diode, and on-off operations of the switching element are controlled based on the difference between the voltage between the terminals of the current detection resistor and the output voltage from the fixed-voltage supply. The current flowing through the LEDs are thus controlled such that the current does not exceed a predetermined current value.

CITATION LIST

Patent Literature

[Patent Literature 1] Japanese Patent Application Publication No. 2011-90901

SUMMARY OF INVENTION

Technical Problem

When a Zener diode is used in a fixed-voltage supply, it is common that a voltage divider circuit configured as an resistor is connected to the output terminal of the DC power supply and the Zener diode is connected to the output terminal of the voltage divider circuit. In the case of a common DC power supply that rectifies and smoothes utility power voltage, the output voltage from the DC power supply has a high value of approximately 100V. In contrast, the output voltage from a fixed-voltage supply is required to have a low value of a few volts. Therefore, the fixed-voltage supply needs to divide voltage of approximately 100 V from the DC power supply into voltages of a few volts by using the voltage divider circuit. In this way, when the difference between the input voltage to the fixed-voltage supply and the output voltage from the fixed-voltage supply is large (e.g. approximately 90V), a relatively large voltage is applied to the resistor included in the voltage divider circuit, and power loss in the resistor increases. This leads to an increase in power loss in the entire fixed-voltage supply.

The present invention is made in view of the above-described problem, and aims to provide a power supply circuit that is capable of reducing power loss in a voltage output circuit, and, furthermore, performing power stabilization control.

Solution to Problem

A power supply circuit pertaining to one aspect of the present invention includes: a DC power supply; a switching element disposed in a current path extending from an output terminal at a high-potential side of the DC power supply to an output terminal at a low-potential side of the DC power supply, via a load; a transformer including a primary coil disposed in the current path and a secondary coil magnetically coupled with the primary coil; a current detector circuit detecting current flowing through the switching element, and outputting voltage corresponding to the current thus detected; a voltage output circuit outputting, while the switching element is in a turned-on state, voltage that is dependent on voltage induced by the secondary coil; and an on-off control circuit turning off the switching element when an absolute value of a difference between the voltage output by the current detector circuit and the voltage output by the voltage output circuit is equal to or greater than a threshold voltage, and turning on the switching element when the absolute value of the difference is smaller than the threshold voltage.

Advantageous Effects of Invention

With the stated structure, when the switching element is in the turned-on state, the voltage output circuit outputs voltage that is dependent on the voltage induced by the secondary coil. The input voltage to the voltage output circuit can be adjusted by adjusting the turns ratio of the transformer. Therefore, by adjusting the input voltage to the voltage output circuit to be close to the output voltage from the voltage output circuit, it is possible to reduce the difference between the input voltage to the voltage output circuit and the output voltage from the voltage output circuit, and thereby reduce power loss in the voltage output circuit.

DESCRIPTION OF EMBODIMENTS

Embodiment

<1> Configuration

Figure 1:
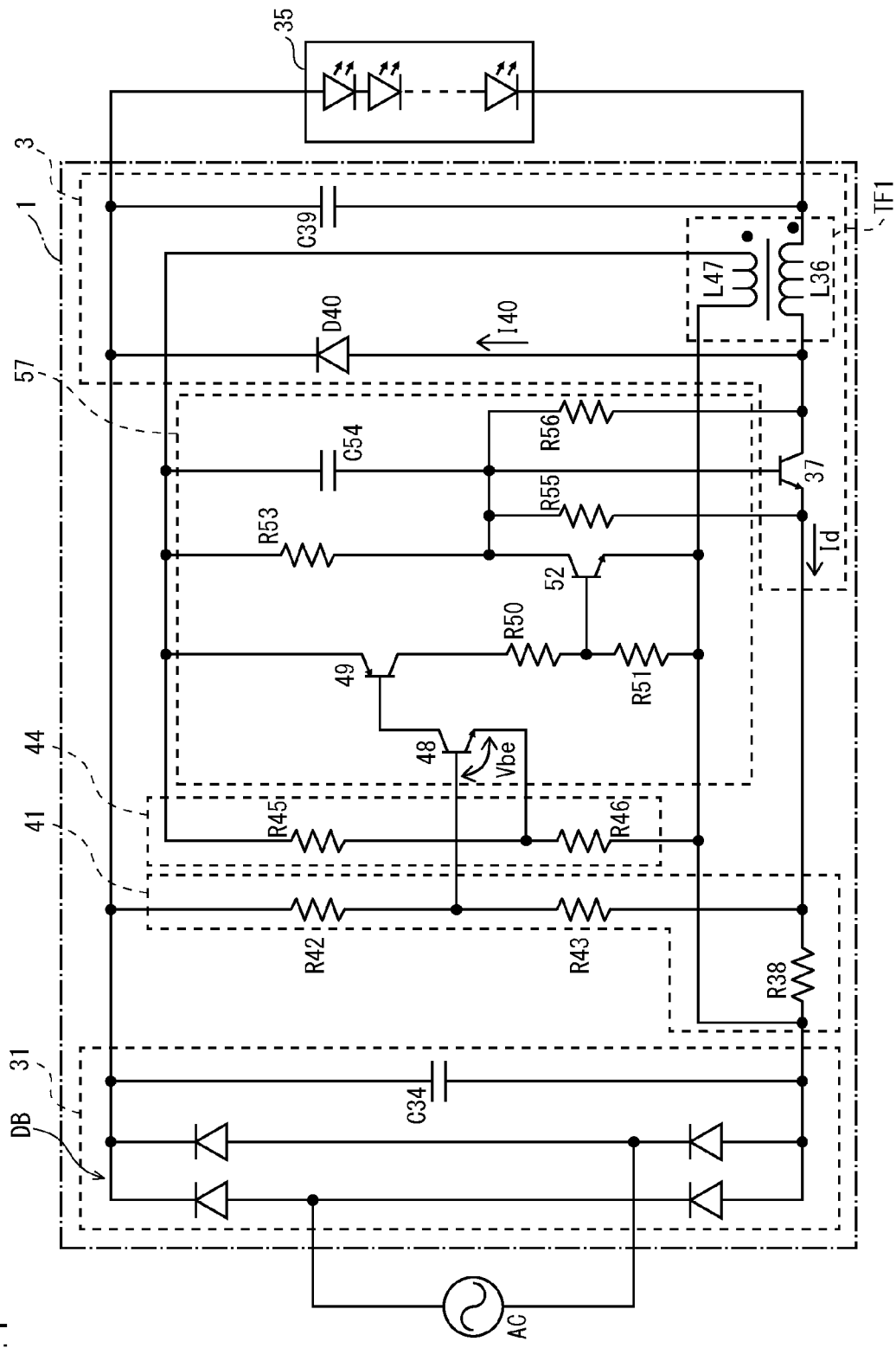
FIG. 1 is a circuit diagram illustrating a power supply circuit pertaining to an embodiment.

FIG. 1 is a circuit diagram illustrating a power supply circuit 1 pertaining to the present embodiment.

The power supply circuit 1 includes: a rectifying and smoothing circuit 31 connected to an alternating current power supply AC; a voltage conversion circuit 3 reducing DC voltage output from the rectifying and smoothing circuit 31 and outputting the voltage thus reduced to a light-emitting module 35 serving as a load; and a drive circuit for driving the voltage conversion circuit 3. The power supply AC outputs AC at a voltage having an actual value of 100 V for example. The light-emitting module 35 includes a series circuit composed of a plurality of LEDs connected in series.

<1-1> Rectifying and Smoothing Circuit

The rectifying and smoothing circuit 31 includes: a diode bridge DB composed of four diodes; and a smoothing capacitor C34 connected across the output terminals of the diode bridge DB. The rectifying and smoothing circuit 31 converts the alternating current from the power supply AC to pulsating current by using the diode bridge DB, smoothes the pulsating current by using the capacitor C34 for smoothing, and thus outputs direct current. The capacitor C34 is for example an electrolytic capacitor, a high dielectric constant ceramic capacitor, or a film capacitor.

<1-2> Voltage Conversion Circuit

The voltage conversion circuit 3 includes a transformer TF1, a transistor (switching element) 37, a diode D40, and a capacitor C39.

The transformer TF1 has a primary coil L36 and a secondary coil L47. A first terminal of the primary coil L36 is connected to the light-emitting module 35. The turns ratio of the primary coil L36 and the secondary coil L47 in the transformer TF1 is set according to the output voltage from a voltage output circuit 44. For example, when the output voltage from the voltage output circuit 44 is approximately 5 V, the turns ratio is set such that the voltage induced between the terminals of the secondary coil L47 will be approximately 10 V to 20 V. In the transformer TF1, the primary coil L36 and the secondary coil L47 have the same polarity.

The transistor 37 is configured as an NPN bipolar transistor. The collector of the transistor 37 is connected to a second terminal of the primary coil L36 of the transformer TF1, the emitter of the transistor 37 is connected to a current detector circuit 41, and the base of the transistor 37 is connected to an on-off control circuit 57.

The anode of the diode D40 is connected to the node between the primary coil L36 of the transformer TF1 and the transistor 37, and the cathode of the diode D40 is connected to the output terminal at the high-potential side of the rectifying and smoothing circuit 31.

The capacitor C39 is connected between the above-mentioned first terminal of the primary coil L36 of the transformer TF1 and the cathode of the diode D40.

<1-3> Drive Circuit

The drive circuit includes: a current detector circuit 41 connected to the primary coil L36 of the transformer TF1; a voltage output circuit 44 connected to the secondary coil L47 of the transformer TF1; and an on-off control circuit 57 controlling on-off operations of the transistor 37 according to the output voltages from the current detector circuit 41 and the voltage output circuit 44.

<Current Detector Circuit>

The current detector circuit 41 includes three resistors R42, R43 and R38 connected in series across the output terminals of the rectifying and smoothing circuit 31. The resistor R42 is connected to the output terminal at the high-potential side of the rectifying and smoothing circuit 31, and the resistor R38 is connected to the output terminal at the low-potential side of the rectifying and smoothing circuit 31. The node between the resistors R42 and R43 is connected to the on-off control circuit 57, and the node between the resistor R38 and the resistor R43 is connected to the emitter of the transistor 37.

<Voltage Output Circuit>

The voltage output circuit 44 includes two resistors R45 and R46 connected in series between the terminals of the secondary coil L47 of the transformer TF1. The voltage output circuit 44 outputs voltage between the node between the resistors R45 and R46 and the output terminal at the low-potential side of the rectifying and smoothing circuit 31.

<On-Off Control Circuit>

The on-off control circuit 57 includes transistors 48, 49 and 52, resistors R50, R51, R53, R55 and R56, and a capacitor C54.

The transistor 48 is configured as an NPN bipolar transistor. The base of the transistor 48 is connected to the output terminal of the current detector circuit 41, and the emitter of the transistor 48 is connected to the output terminal of the voltage output circuit 44. The turn-on voltage (hereinafter referred to as "threshold voltage") of the transistor 48 is a threshold voltage of the absolute value of the difference between the output voltage from the current detector circuit 41 and the output voltage from the voltage output circuit 44.

The transistor 49 is configured as a PNP bipolar transistor. The base of the transistor 49 is connected to the collector of the transistor 48, and the emitter of the transistor 49 is connected to the secondary coil L47 of the transformer TF1.

The resistors R50 and R51 are connected in series between the collector of the transistor 49 and the output terminal at the low-potential side of the rectifying and smoothing circuit 31.

The transistor 52 is configured as an NPN bipolar transistor. The base of the transistor 52 is connected to the node between the resistors R50 and R51, the emitter of the transistor 52 is connected to the output terminal at the low-potential side of the rectifying and smoothing circuit 31, and the collector of the transistor 52 is connected to the secondary coil L47 of the transformer TF1 via the resistor R53. The collector of the transistor 52 is connected to the base of the transistor 37.

The resistor R55 is connected between the collector of the transistor 52 and the emitter of the transistor 37. The resistor R56 is connected between the collector of the transistor 52 and the collector of the transistor 37. The capacitor C54 is connected between the base of the transistor 37 and the secondary coil L47 of the transformer TF1.

The series circuit composed of the transistors 48 and 49 and the resistors R50 and R51 serves as a two-level voltage output circuit that outputs voltage at a first level when the absolute value of the difference between the output voltage from the voltage output circuit 44 and the output voltage from the current detector circuit 41 is equal to or greater than the threshold voltage, and outputs voltage at a second level when the aforementioned absolute value of the difference is smaller than the threshold voltage.

The voltage at the first level is equal to or greater than the threshold voltage of the transistor 52, and the voltage at the second level is substantially 0V.

The transistor 52 serves as an on-off control switching element that turns off the transistor 37 when the output voltage from the two-level voltage output circuit is at the first level, and turns on the transistor 37 when the output voltage from the two-level voltage output circuit is at the second level.

<2> Operation

The following explains operation of the power supply circuit 1 pertaining to the present embodiment.

Figure 2:
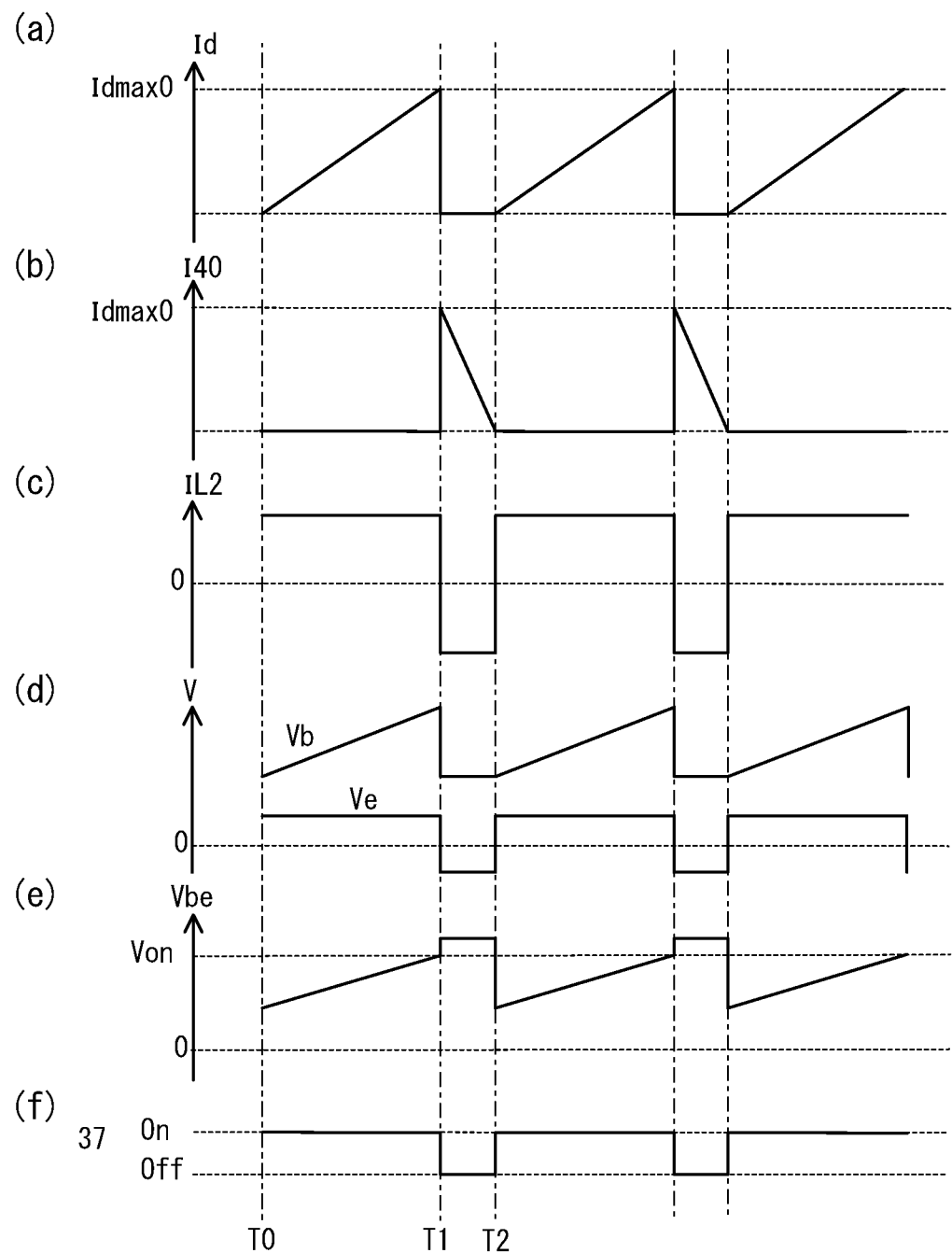
FIG. 2 is a waveform chart provided in order to explain operation of a power supply circuit pertaining to an embodiment.

FIG. 2 is a waveform chart provided in order to explain the operation of the power supply circuit 1.

First, when the power supply AC starts supplying AC power to the power supply circuit 1 (at time T0 in FIG. 2), the rectifying and smoothing circuit 31 inputs AC voltage to the voltage conversion circuit 3. When DC voltage is input to the voltage conversion circuit 3, the voltage between the terminals of the resistor R55 is applied between the base and the emitter of the transistor 37, and thus the transistor 37 is set in the turned-on state.

When the transistor 37 is set in the turned-on state, current Id (the arrow Id in FIG. 1) flows from the output terminal at the high-potential side of the rectifying and smoothing circuit 31 to the output terminal at the low-potential side of the rectifying and smoothing circuit 31 via the light-emitting module 35 or the capacitor C39, the primary coil L36 of the transformer TF1, the transistor 37 and the resistor R38. The magnitude of the current Id increases linearly and monotonically while the current Id passing through the light-emitting module 35 and the primary coil L 36 of the transformer TF1 (from time T0 to time T1 in section (a) of FIG. 2). During this period, the magnitude of the current IL2 passing through the secondary coil L47 of the transformer TF1 is constant (from time T0 to time T1 in section (c) of FIG. 2), and a constant voltage is being generated between the terminals of the secondary coil L47. The voltage generated in the secondary coil L47 is (Vin−VF)/n when the transistor 37 is ON, and is (VF+VD40)/n when the transistor 37 is OFF. Thus, current is continuously supplied from the secondary coil L47 to the base of the transistor 37 via the resistor R53, and accordingly the transistor 37 is maintained in the turned-on state. Since the voltage generated between the terminals of the secondary coil L47 is constant, the voltage between the terminals of the resistor R46 is maintained at a constant value, and the potential Ve at the node between the resistors R45 and R46 of the voltage output circuit 44 is also maintained at a constant value (from time T0 to time T1 in section (d) of FIG. 2).

In contrast, the voltage between the terminals of the resistor R38 increases according to the increase of the current flowing through the transistor 37 (from time T0 to time T1 in section (a) of FIG. 2). The potential Vb at the node between the resistors R42 and R43 of the current detector circuit 41 also increases according to the increase in voltage between the terminals of the resistor R38 (from time T0 to time T1 in section (d) of FIG. 2). Thus, the potential Vb at the node between the resistors R42 and R43 of the current detector circuit 41 gradually increases, whereas the potential Ve at the node between the resistors R45 and R46 of the voltage output circuit 44 is maintained at a constant value. Therefore, the potential difference Vbe between these potentials gradually increases with the passage of time (from time T0 to time T1 in section (e) of FIG. 2). Here, the node between the resistors R42 and R43 of the current detector circuit 41 is connected to the base of the transistor 48 of the on-off control circuit 57, and the node between the resistors R45 and R46 of the voltage output circuit 44 is connected to the emitter of the transistor 48 of the on-off control circuit 57. Therefore, the voltage applied between the base and the emitter of the transistor 48 gradually increases with the passage of time.

When the voltage applied between the base and the emitter of the transistor 48 reaches a threshold voltage Von of the transistor 48, the transistor 48 is turned on, the transistor 49 is turned on, and current flows through the resistors R50 and R51. Then, the voltage generated between the terminals of the resistor R51 is applied between the base and the emitter of the transistor 52, and the transistor 52 is turned on. Consequently, the base and the emitter of the transistor 37 are short-circuited, and the transistor 37 is turned off (at time T1 in section (f) of FIG. 2).

Upon turning off of the transistor 37, the current flowing through the transistor 37 is cut off (from time T1 to time T2 in section (a) of FIG. 2), and current I40 flows from the primary coil L36 and returns to the primary coil L36 via the diode D40 and the light-emitting module 35. At this point, the energy accumulated in the primary coil L36 is being discharged toward the light-emitting module 35. The current I40 flowing through the diode D40 decreases linearly and monotonically (from time T1 to time T2 in section (b) of FIG. 2). During this period, a constant voltage is being generated between the terminals of the primary coil L36, where the first terminal of the primary coil L36, which is connected to the anode of the diode D40, has a higher potential than the second terminal of the primary coil L36. Also, a constant voltage is being generated in the secondary coil L47 having the same polarity as the primary coil L36, where the first terminal of the secondary coil L47, which is connected to the terminal at the low-potential side of the rectifying and smoothing circuit 31, has a higher potential than the second terminal of the secondary coil L47. Accordingly, the potential Ve at the node between the resistors R45 and R46 of the voltage output circuit 44 is maintained at a constant value that is lower than the output terminal at the low-potential side of the rectifying and smoothing circuit 31 (from time T1 to time T2 in section (d) of FIG. 2).

Meanwhile, current does not flow through the resistor R38 due to turning off of the transistor 37, and consequently, the potential Vb at the node between the resistors R42 and R43 of the current detector circuit 41 first drops sharply (at time T1 in section (d) of FIG. 2), and is then maintained at a constant value (from time T1 to time T2 in section (d) of FIG. 2). During this period, the potential difference Vbe, which is the difference between the potential Vb at the node between the resistors R42 and R43 of the current detector circuit 41 and the potential Ve at the node between the resistors R45 and R46 of the voltage output circuit 44, is no less than the threshold voltage of the transistor 48 because the potential Ve is a negative potential, and therefore maintains the turned-on state of the transistor 48. However, the collector current of the transistor 48 does not flow because the collector potential of the transistor 48 is also a negative potential. Consequently, the transistor 49 is maintained in the turned-off state, the transistor 52 is maintained in the turned-off state, and the transistor 37 is also maintained in the turned-off state because Vbe of the transistor 37 is maintained at a negative potential (from time T1 to time T2 in section (f) of FIG. 2).

Subsequently, when all the energy accumulated in the primary coil L36 of the transformer TF1 has been discharged, the voltage between the terminals of the secondary coil L47 of the transformer TF1 becomes zero. This is because di/dt of the current flowing through the primary coil becomes zero. Consequently, current does not flow through the secondary coil L2, and the potential Ve at the node between the resistors R45 and R46 of the voltage output circuit 44 rises sharply. At this point, the potential difference Vbe, which is the difference between the potential Vb at the node between the resistors R42 and R43 of the current detector circuit 41 and the potential Ve at the node between the resistors R45 and R46 of the voltage output circuit 44, becomes smaller than the threshold voltage of the transistor 48. Consequently, the transistor 48 is turned off, and consecutively the transistors 49 and 52 are turned off, and hence the transistor 37 is turned off (at time T2 in section (f) of FIG. 2).

The power supply circuit 1 repeats the above-described operation as long as power is supplied from the power supply AC.

Meanwhile, in the power supply circuit 1, it is possible to change the increase rate of the current flowing through the primary coil L36 by changing the inductance of the primary coil L36 of the transformer TF1. However, the increase rate does not change if the value of the resistor R38 is increased. If the value of the resistor R38 is simply increased, only the frequency changes according to the increase of the peak value and the increase of the turn-on period. The increase rate is determined by: a potential difference obtained by subtracting voltage VF between the terminals of the light-emitting module 35, voltage between the terminals of the resistor R38, and voltage V37on of the transistor 37 in the turned-on state from voltage Vin; and the inductance of the primary coil L36 of the transformer TF1. Among these, the voltage between the terminals of the resistor R38 and the voltage V37on of the transistor 37 in the turned-on state are negligibly small relative to the voltage Vin.

Figure 3:
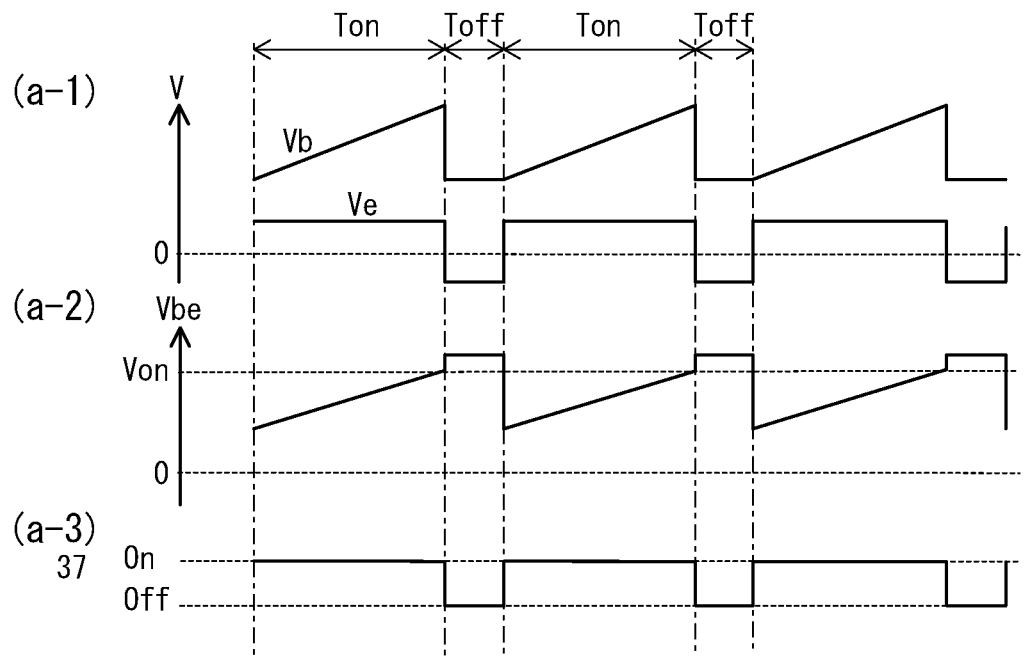
FIG. 3 is a waveform chart provided in order to explain operation of a power supply circuit pertaining to an embodiment.
Figure 3:
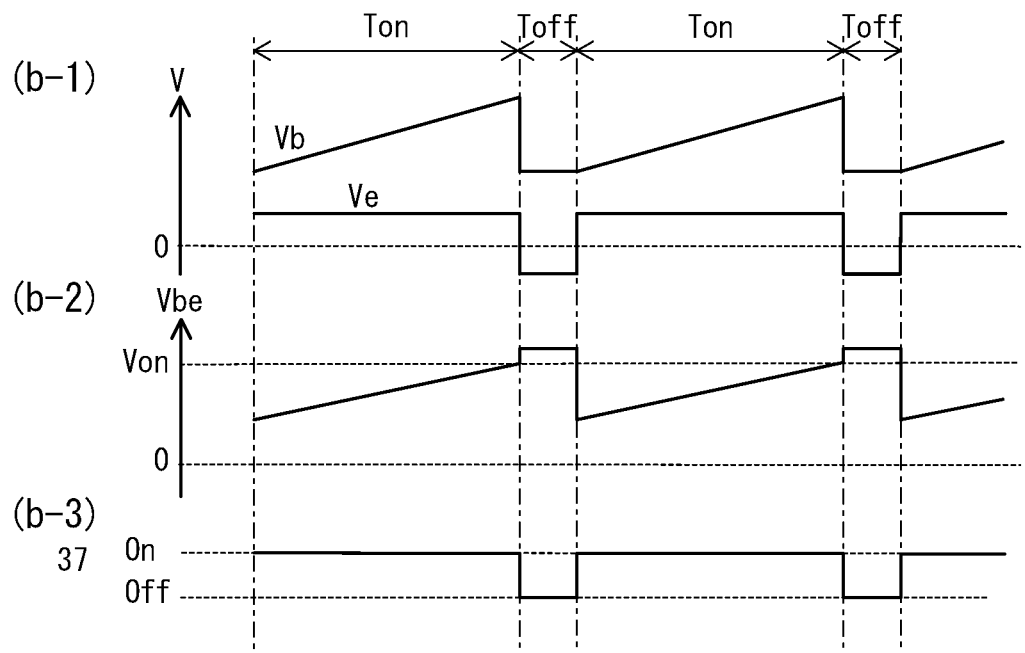

Parts (a-1) through (a-3) and (b-1) through (b-3) of FIG. 3 are waveform charts provided in order to explain operation of the power supply circuit 1 pertaining to Embodiment. Parts (a-1) through (a-3) in FIG. 3 show waveform charts when the resistance value of the resistor R38 is set at a first resistance value, which is a predetermined value. Parts (b-1) through (b-3) in FIG. 3 show waveform charts when the resistance value of the resistor R38 is set at a second resistance value, which is a predetermined value smaller than the first resistance value.

As shown in Parts (a-1) and (b-1), the time until the potential Vb at the node between the resistors R42 and R43 reaches the maximum value is longer for a larger resistance value of the resistor R38. Accordingly, the time until the voltage between the base and the emitter of the transistor 48 reaches the threshold voltage is longer for a larger resistance value. In consequence, the turn-on period of the transistor 37 is longer. When the resistance value of the resistor R38 is large, the time until the voltage between the base and the emitter of the transistor 37 reaches the threshold voltage is short, and the waveform differs from the waveforms shown in FIG. 3. This is because the inclination of the current flowing through the primary coil L36 of the transformer TF1 is determined by the inductance of the primary coil L36.

Thus, the power supply circuit 1 controls the turn-on period of the transistor 37 by changing the resistance value of the resistor R38.

<3> Stability of Output Voltage from Power Supply Circuit 1

The following explains the stability of the output voltage from the power supply circuit 1.

During operation of the power supply circuit 1, when the transistor 37 is in the turned-on state, potential Vb at the node between the resistors R42 and R43 of the current detector circuit 41 (i.e. the base potential of the transistor 48) is represented by Equation (1) below:

[Math. 1]

$$Vb = Vin \times \frac{R43}{R42 + R43} + R38 \times Id \qquad \text{Equation (1)}$$

Vin denotes the input voltage to the voltage conversion circuit 3 from the rectifying and smoothing circuit 31, R38, R42 and R43 respectively denote the resistance values of the resistors R38, R42 and R43, and Id denotes the value of the current flowing through the transistor 37.

Potential Ve at the node between the resistors R45 and R46 of the voltage output circuit 44 (i.e. the emitter potential of the transistor 48) is represented by Equation (2) below:

[Math. 2]

$$Ve = VL2 \times \frac{R46}{R45 + R46} = \frac{VL1}{n} \times \frac{R46}{R45 + R46} = \frac{Vin - Vf}{n} \times \frac{R46}{R45 + R46} \qquad \text{Equation (2)}$$

VL2 denote voltage between the terminals of the secondary coil L47 of the transformer TF1, R45 and R46 respectively denote resistance values of the resistors R45 and R46, R45, VL1 denotes voltage between the terminals of the primary coil L36 of the transformer TF1, Vf denotes voltage between the terminals of the light-emitting module 35, and n denotes the turns ratio of the primary coil L36 and the secondary coil L47. The voltage Vf changes according to the number of the LEDs in the light-emitting module 35.

As described above, upon turning off of the transistor 48, the current flowing through the transistor 37 is cut off. The magnitude of the current Id flowing through the transistor 37 is at the maximum when the transistor 48 is turned on (See Parts (a) and (f) in FIG. 2).

When Idmax denotes the maximum value of the current Id flowing through the transistor 37, Equation (3) below can be obtained based on Equation (1) and Equation (2).

[Math. 3]

$$Vbeth = Vb\max - Ve = Vin \times \frac{R46}{R45 + R46} + R38 \times Id\max - \frac{Vin - Vf}{n} \times \frac{R46}{R45 + R46} \qquad \text{Equation (3)}$$

Equation (3) can be transformed into Equation (4) below.

[Math. 4]

$$Vf = \frac{n \times (R45 + R46)}{R46} \times \left[\left\{\frac{R46}{n \times (R45 + R46)} - \frac{R43}{R42 + R43}\right\} \times Vin + (Vbe - R38 \times Id\max)\right] \qquad \text{Equation (4)}$$

As can be seen from Equation (4), it is possible to change the relationship among the voltage Vf between the terminals of the light-emitting module 35, the input voltage Vin to the voltage conversion circuit 3 from the rectifying and smoothing circuit 31, and the maximum value Idmax of the current flowing through the transistor 37 by changing the resistance values of the resistors R38, R42, R43, R45 and R46 and the turns ratio n of the transformer TF1.

As can be seen from Equation (4), it is also possible to eliminate the dependency on the magnitude of the input voltage Vin (i.e. set 0 to the coefficient of the input voltage Vin) by appropriately setting the resistance values of the resistors R38, R42, R43, R45 and R46 and the turns ratio n of the transformer TF1. If this is the case, Equation (4) can be transformed into Equation (5) below.

[Math. 5]

$$Vf = \frac{n \times (R45 + R46)}{R46} \times (Vbe - R38 \times Id\max) \quad \text{Equation (5)}$$

In this way, variation in the voltage Vf between the terminals of the light-emitting module 35, caused by variation in the input voltage Vin, can be prevented by appropriately setting the resistance values of the resistors R38, R42, R43, R45 and R46 and the turns ratio n of the transformer TF1.

Also in this case, power Wf supplied to the light-emitting module 35 can be represented by Equation (6) below:

[Math. 6]

$$Wf = Vf \times Iave = Vf \times \frac{1}{2} \times Id\max = \quad \text{Equation (6)}$$
$$Vf \times \frac{1}{2} \times \frac{1}{R38}\left\{-\frac{R46 \times Vf}{n \times (R45 + R46)} + Vbeth\right\}$$

Iave denotes the average value of the current flowing through the light-emitting module 35. As shown in section (a) of FIG. 2, when the transistor 37 is in the turned-on state, the magnitude of the current flowing from the light-emitting module 35 to the primary coil L36 of the transformer TF1 and the transistor 37 increases linearly and monotonically from 0A to the maximum value Idmax. On the other hand, as shown in section (b) of FIG. 2, when the transistor 37 is in the turned-off state, the magnitude of the current flowing from the transformer TF1 to the diode D40 and the light-emitting module 35 decreases linearly and monotonically from the maximum value Idmax to 0A. Therefore, the average value Iave of the current flowing through the light-emitting module 35 is a half of the maximum value Idmax of the current flowing through the transistor 37.

The following is a study of variation in power supplied to the light-emitting module 35 responding to variation in the voltage Vf between the terminals of the light-emitting module 35. The amount of variation (ΔWf/ΔVf) in the power Wf supplied to the light-emitting module relative to variation in the voltage Vf can be represented by Equation (7) below.

[Math. 7]

$$\frac{\Delta Wf}{\Delta Vf} = \frac{1}{2 \times R38} \times \left\{-\frac{2 \times R46}{n \times (R45 + R46)} Vf + Vbeth\right\} \quad \text{Equation (7)}$$

As can be seen from Equation (7), when the voltage Vf is equal to the value of the voltage rating of the light-emitting module 35, the amount of variation in the supply power Wf can be set to "0" by appropriately setting the resistance values of the resistor R45 and R46. Therefore, when the voltage Vf changes to be greater than the value of the voltage rating, the supply power Wf decreases, and when the voltage Vf changes to be smaller than the value of the voltage rating, the supply power Wf increases. Consequently, it is possible to stabilize the voltage Vf between the terminals of the light-emitting module 35 at the value of the voltage rating.

For users of LED lamps and manufactures of lamps, it is preferable to control the LED power to be constant in order to realize fixed brightness of LEDs.

In other words, Equation (7) shows that when a light-emitting module 35 composed of LEDs has a large power rating VF for example, a normal fixed-current control circuit supplies a large power to the light-emitting module 35, and the LEDs emit too bright light. In contrast, according to the power supply circuit pertaining to the present embodiment, ΔWf will be negative. This means that L36 voltage decreases, L47 voltage decreases, VR 46 decreases, and accordingly the turn-on timing of the transistor 48 becomes earlier and Idmax decreases. In this way, the power supply circuit pertaining to the present embodiment automatically suppresses the power so as to control the power to be fixed. If this is the case, the increase rate of the voltage between the terminals of the resistor R38 decreases, and thus the turn-on period becomes long. Therefore, the power supply circuit is capable of supplying a fixed power even when the power rating of the light-emitting module 35 is changed.

Furthermore, when the temperature of the LEDs rises and the power of the light-emitting module 35 composed of the LEDs becomes smaller than the power rating VF, a normal step-down chopper circuit driven under the fixed-current control supplies a smaller amount of power to the light-emitting module 35, and consequently the amount of light from the LEDs decreases. In contrast, the power supply circuit pertaining to the present embodiment is capable of fixing the LED power by increasing Idmax even when the temperature rises, thereby realizing fixed brightness.

<4> Conclusion

According to the power supply circuit 1 pertaining to the present embodiment, the voltage output circuit 44 outputs voltage depending on the voltage induced by the secondary coil L47 when the transistor 37 is turned on. The input voltage to the voltage output circuit 44 can be changed by changing the turns ratio of the transformer TF1. Therefore, the difference between the input voltage to the voltage output circuit 44 and the output voltage from the voltage output circuit 44 can be reduced by changing the input voltage to the voltage output circuit 44 to be close to the output voltage from the voltage output circuit 44. Thus, the power supply circuit 1 is capable of reducing power loss in the voltage output circuit 44.

Also, power loss in the voltage output circuit 44 is smaller than power loss in a voltage output circuit using a Zener diode. Therefore, the amount of heat generated in the voltage output circuit 44 is smaller than the amount of heat generated in a voltage output circuit using a Zener diode. Thus, the power supply circuit 1 is capable of reducing the heat load thereon.

<Modifications>

(1) Embodiment above describes an example case in which the light-emitting module 35 is connected between the cathode of the diode D40 and the primary coil L36 of the transformer TF1 of the power supply circuit 1. However, the light-emitting module 35 is not necessarily connected to in this way. For example, the light-emitting module 35 may be connected between the anode of the diode D40 and the primary coil L36 of the transformer TF1. If this is the case, the capacitor C39 is to be connected between the anode of the diode D40 and the primary coil L36 of the transformer TF1 in parallel with the light-emitting module 35.

This configuration addresses the case where there is no choice but to connect the light-emitting module 35 between the anode of the diode D40 and the primary coil L36 of the transformer TF1 due to limited space within the housing of the apparatus having the power supply circuit 1.

(2) Embodiment above describes an example of the power supply circuit 1 in which the transistors 48, 52 and 37 are configured as NPN bipolar transistors and the transistor 49 is configured as a PNP bipolar transistor. However, the transistors 48, 49, 52 and 37 are not necessarily configured as bipolar transistors.

Figure 4:
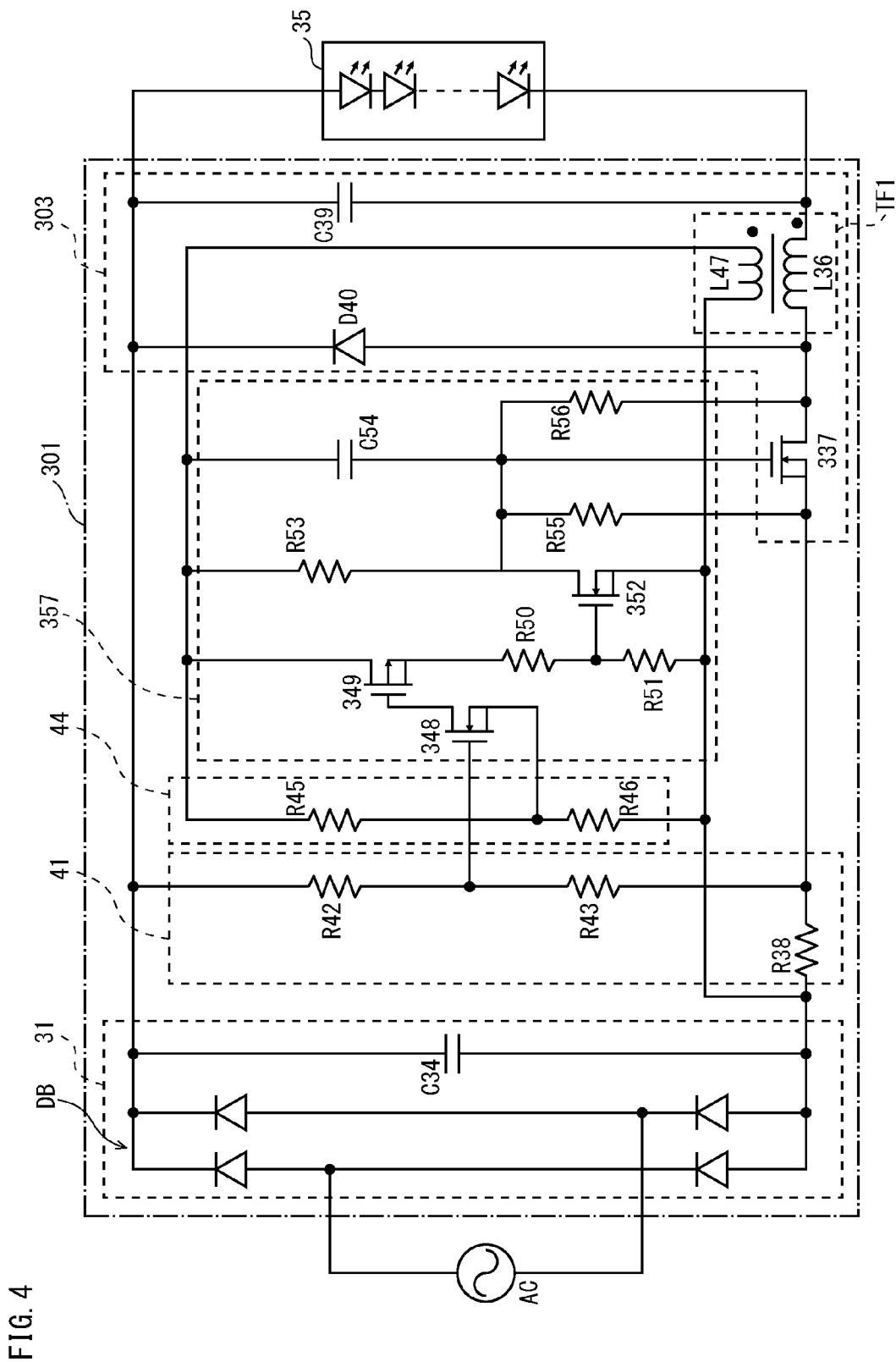
FIG. 4 is a circuit diagram illustrating a power supply circuit pertaining to a modification.

FIG. 4 is a circuit diagram illustrating a power supply circuit 301 pertaining to the present modification. Elements of configuration which are the same as in the power supply circuit 1 pertaining to Embodiment are labeled using the same reference signs and explanation thereof is omitted where appropriate.

In the power supply circuit 301, as shown in FIG. 4, transistors 348 and 352 included an on-off control circuit 357 are configured as N-channel MOSFETs, and a transistor 349 is configured as a P-channel MOSFET. A transistor 337 included in the voltage conversion circuit 303 is configured as an N-channel MOSFET.

In the on-off control circuit 357 pertaining to the present modification, the threshold voltage of the transistor 348 corresponds to the absolute value of the difference between the output voltage from the current detector circuit 41 and the output voltage from the voltage output circuit 44.

The series circuit composed of the transistors 348 and 349 and the resistors R50 and R51 serves as a two-level voltage output circuit that outputs voltage at a first level when the absolute value of the difference between the output voltage of the voltage output circuit 44 and the output voltage of the current detector circuit 41 is equal to or greater than the threshold voltage, and outputs voltage at a second level when the aforementioned absolute value of the difference is smaller than the threshold voltage. The voltage at the first level is equal to or greater than the threshold voltage of the transistor 352, and the voltage at the second level is substantially 0V.

The transistor 352 serves as an on-off control switching element that turns off the transistor 337 when the output voltage from the two-level voltage output circuit is at the first level, and turns on the transistor 337 when the output voltage from the two-level voltage output circuit is at the second level.

This configuration improves the degree of integration of the circuits, and realizes miniaturization of the power supply circuit 301 as a whole.

Note that some of the transistors 348, 349, 352 and 337 in the power supply circuit 301 pertaining to the present modification may be configured as MOSFETs, and the rest may be configured as bipolar transistors.

(3) Embodiment above describes an example case in which the on-off control circuit 57 in the power supply circuit 1 performs on-off control for the transistor 37 according to the magnitude relationship between: the potential difference between the potential at the node between the resistors R42 and R43 of the current detector circuit 41 and the potential at the node between the resistors R45 and R46 of the voltage output circuit 44; and the threshold voltage of the transistor 48. However, the circuit configuration of the on-off control circuit 57 is not limited to this.

Figure 5:
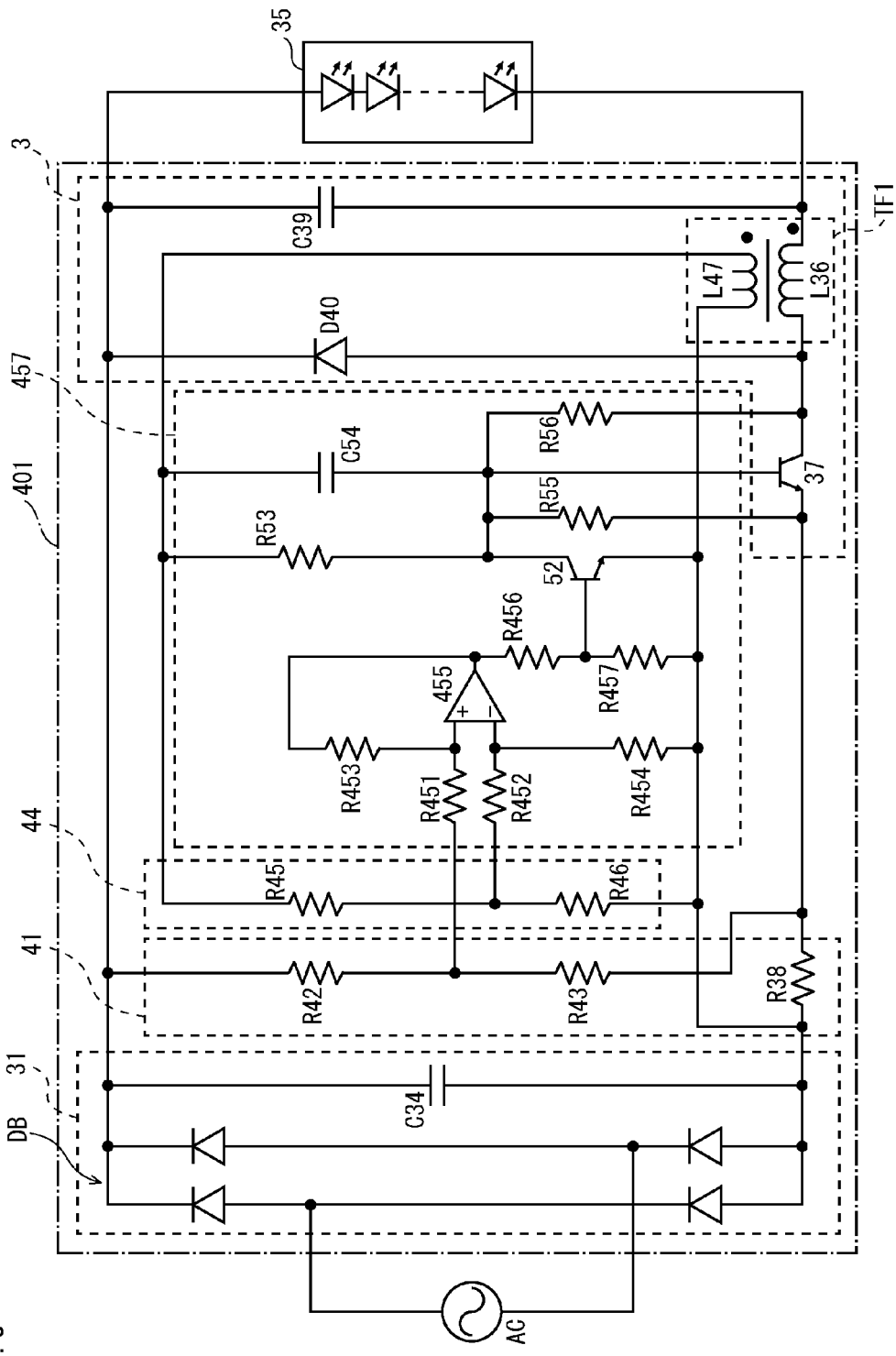
FIG. 5 is a circuit diagram illustrating a power supply circuit pertaining to a modification.

FIG. 5 is a circuit diagram illustrating a power supply circuit 401 pertaining to the present modification. Elements of configuration which are the same as in the power supply circuit 1 pertaining to Embodiment are labeled using the same reference signs and explanation thereof is omitted where appropriate.

As shown in FIG. 5, the on-off control circuit 457 of the power supply circuit 401 is different from the on-off control circuit 57 pertaining to Embodiment in that the on-off control circuit 457 includes an operational amplifier 455 and resistors R451, R452, R453, R454, R456 and R457. Elements of configuration which are the same as in Embodiment are labeled using the same reference signs and explanation thereof is omitted where appropriate.

The input terminal at the positive side of the operational amplifier 455 is connected to the node between the resistors R42 and R43 of the current detector circuit 41 via the resistor R451, and to the output terminal via the resistor R453. The input terminal at the negative side of the operational amplifier 455 is connected to the node between the resistors R45 and R46 of the voltage output circuit 44 via the resistor R452, and to the output terminal at the low-potential side of the rectifying and smoothing circuit 31 via the resistor R454. The resistors R456 and R457 are connected in series between the output terminal of the operational amplifier 455 and the output terminal at the low-potential side of the rectifying and smoothing circuit 31, and thus a voltage divider circuit is formed. The output voltage from the voltage divider circuit is input to the base of the transistor 52.

In the on-off control circuit 457 pertaining to the present modification, the threshold voltage of the transistor 52 corresponds a voltage that is proportional to the absolute value of the difference between the output voltage from the current detector circuit 41 and the output voltage from the voltage output circuit 44.

Furthermore, the operational amplifier 455 and the resistors R451, R452, R453, R454, R456 and R457 constitute a difference output circuit that outputs voltage that is proportional to the absolute value of the difference between the output voltage from the current detector circuit 41 and the output voltage from the voltage output circuit 44.

The transistor 52 serves as an on-off control switching element that turns off the transistor 37 when the voltage that is proportional to the absolute value of the difference is equal to or greater than the threshold voltage, and turns on the transistor 37 when the voltage that is proportional to the absolute value of the difference is smaller than the threshold voltage.

In this on-off control circuit 457, the output voltage from the operational amplifier 455 is proportional to the difference between the potential at the node between the resistors R42 and R43 of the current detector circuit 41 and the potential at the node between the resistors R45 and R46 of the voltage output circuit 44. When a voltage divided from the output voltage of the operational amplifier 455 by the voltage divider circuit composed of the resistors R456 and R457 reaches the threshold voltage of the transistor 52, the transistor 52 is turned on.

Note that the on-off control circuit 57 is not necessarily configured as described above. Alternatively, a common totem-pole structure or a common driver IC may be used to reduce the switching loss.

(4) Embodiment above describes an example case where the primary coil L36 of the transformer TF1 and the secondary coil L47 have a same polarity. However, this is not essential for the present invention, and the primary coil of the transformer and the secondary coil may have opposite polarities.

Figure 6:
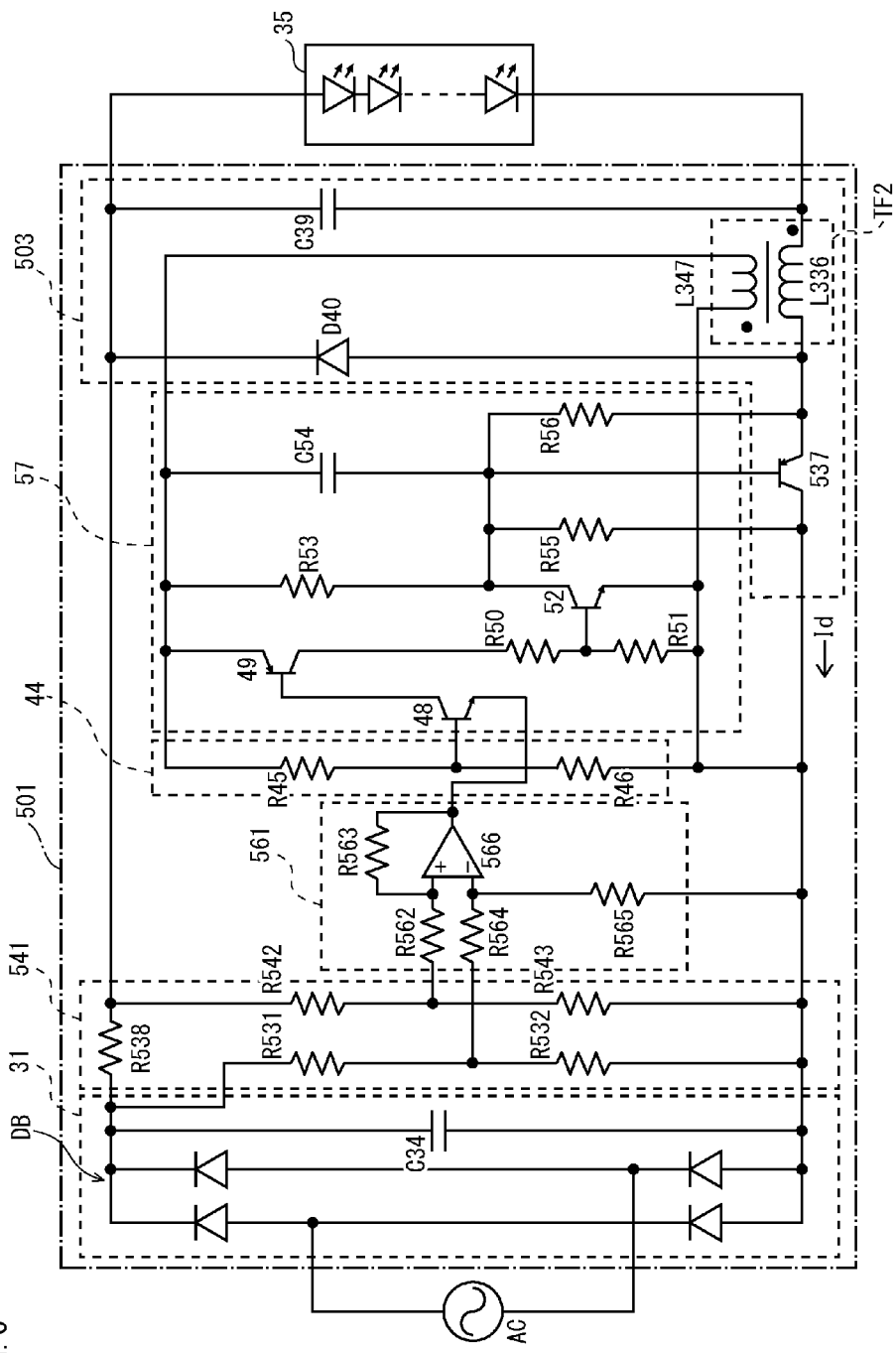
FIG. 6 is a circuit diagram illustrating a power supply circuit pertaining to a modification.

FIG. 6 is a circuit diagram illustrating a power supply circuit 501 pertaining to the present modification.

As shown in FIG. 6, the power supply circuit 501 is different from the power supply circuit 1 pertaining to Embodiment in the structure of a voltage conversion circuit 503 and the structure of a current detector circuit 541. The power supply circuit 501 is different from the power supply circuit 1 pertaining to Embodiment also in that the power supply circuit 501 includes: a voltage divider circuit composed of resistors R531 and R532 connected in series across the output terminals of the rectifying and smoothing circuit 31; and a difference circuit 561. Elements of configuration which are the same as in Embodiment are labeled using the same reference signs and explanation thereof is omitted where appropriate.

The transformer TF2 of the voltage conversion circuit 503 includes a primary coil L336 and a secondary coil L347 that has an opposite polarity as the primary coil L336. A transistor 537 is configured as a PNP bipolar transistor.

The current detector circuit 541 includes three resistors R538, R542 and R543 connected in series across the output terminals of the rectifying and smoothing circuit 31. The resistor R538 is connected to the output terminal at the high-potential side of the rectifying and smoothing circuit 31, and the resistor R543 is connected to the output terminal at the low-potential side of the rectifying and smoothing circuit 31. The node between the resistors R542 and R543 is connected to the difference circuit 561, and the node between the resistors R538 and R542 is connected to the light-emitting module 35.

The difference circuit 561 includes an operational amplifier 566 and resistors R562, R563, R564 and R565. The input terminal at the positive side of the operational amplifier 566 is connected to the node between the resistors R542 and R543 of the current detector circuit 541 via the resistor R562, and is also connected to the output terminal via the resistor R563. The input terminal at the negative side of the operational amplifier 566 is connected to the node between the resistors R531 and R532 via the resistor R564, and is also connected to the output terminal at the low-potential side of the rectifying and smoothing circuit 31 via the resistor R565. The difference circuit 561 outputs a voltage obtained by subtracting the potential at the node between the resistors R531 and R532 from the potential at the node between the resistors R542 and R543 of the current detector circuit 541. The ratio between the resistors R542 and R543 and the ratio between the resistors R531 and R532 are determined such that the potential at the node between the resistors R542 and R543 will be lower than the potential at the node between the resistors R531 and R532.

The output terminal of the voltage output circuit 44 is connected to the base of the transistor 48 included in the on-off control circuit 57, and the output terminal of the difference circuit 561 is connected to the emitter of the transistor 48.

The following describes operations of the power supply circuit 501 pertaining to the present modification.

Figure 7:
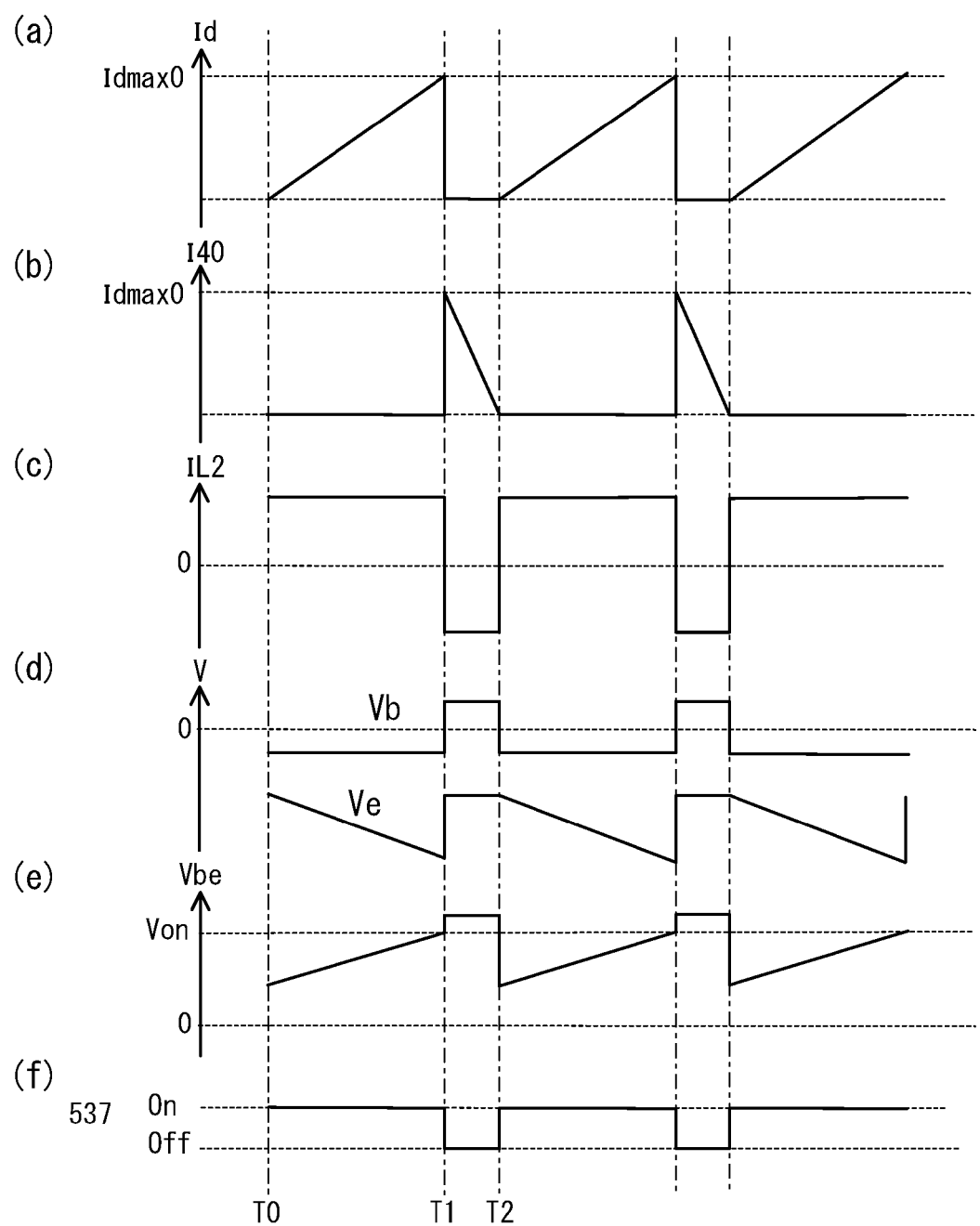
FIG. 7 is a waveform chart provided in order to explain operation of a power supply circuit pertaining to a modification.

FIG. 7 is a waveform chart provided in order to explain the operation of the power supply circuit 501.

First, when the power supply AC starts supplying AC power to the power supply circuit 501 (time T0 in FIG. 7), the rectifying and smoothing circuit 31 inputs AC voltage to the voltage conversion circuit 503. When DC voltage is input to the voltage conversion circuit 503, the voltage between the terminals of the resistor R55 is applied between the base and the emitter of the transistor 537, and thus the transistor 537 is set in the turned-on state.

When the transistor 537 is set in the turned-on state, current Id (the arrow Id in FIG. 1) flows from the output terminal at the high-potential side of the rectifying and smoothing circuit 31 to the output terminal at the low-potential side of the rectifying and smoothing circuit 31 via the resistor R38, the light-emitting module 35 or the capacitor C39, the primary coil L536 of the transformer TF2, and the transistor 537. The magnitude of the current Id increases linearly and monotonically while the current Id passing through the light-emitting module 35 and the primary coil L 536 of the transformer TF2 (from time T0 to time T1 in section (a) of FIG. 7). During this period, the voltage between the secondary coil L547 of the transformer TF2 is constant, and therefore the magnitude of the current flowing through the secondary coil L547 is constant (from time T0 to time T1 in section (c) of FIG. 7). The voltage between the terminals of the secondary coil L547 is constant and has an opposite polarity as the voltage between the terminals of the primary coil L336. Due to this voltage, current continuously flows from the base of the transistor 537 to the secondary coil L347 via the resistor R53, and therefore the transistor 537 is maintained in the turned-on state. Since the voltage generated between the terminals of the secondary coil L347 is constant, the voltage between the terminals of the resistor R45 is maintained at a constant value, and the potential Vb at the node between the resistors R45 and R46 of the voltage output circuit 44 is also maintained at a constant value (from time T0 to time T1 in section (d) of FIG. 7).

In contrast, the voltage between the terminals of the resistor R538 increases according to the increase of the current flowing through the transistor 537 (from time T0 to time T1 in section (a) of FIG. 7). The potential at the node between the resistors R542 and R543 of the current detector circuit 541 decreases according to the increase in voltage between the terminals of the resistor R538, and accordingly the potential Ve at the output terminal of the difference circuit 561 decreases (from time T0 to time T1 in section (d) of FIG. 7). The potential Ve at the output terminal of the difference circuit 561 decreases, whereas the potential Vb at the node between the resistors R45 and R46 of the voltage output circuit 44 is maintained at a constant value. Therefore, the potential difference Vbe between these potentials gradually increases with the passage of time (from time T0 to time T1 in section (e) of FIG. 7). Here, the output terminal of the difference circuit 561 is connected to the emitter of the transistor 48 of the on-off control circuit 57, and the node between the resistors R45 and R46 of the voltage output circuit 44 is connected to the base of the transistor 48 of the on-off control circuit 57. Therefore, the voltage applied between the base and the emitter of the transistor 48 gradually increases with the passage of time.

When the voltage applied between the base and the emitter of the transistor 48 reaches a threshold voltage of the transistor 48, the transistor 48 is turned on, and consecutively the transistor 49 is turned on, and current flows through the resistors R50 and R51. Then, the voltage generated between the terminals of the resistor R51 is applied between the base and the emitter of the transistor 52, and the transistor 52 is turned on. Consequently, the base and the emitter of the transistor 537 are short-circuited, and the transistor 537 is turned off (at time T1 in section (f) of FIG. 7).

Upon turning off of the transistor 537, the current flowing through the transistor 537 is cut off (from time T1 to time T2 in section (a) of FIG. 7), and current I40 flows from the primary coil L336 and returns to the primary coil L336 via the diode D40 and the light-emitting module 35. At this point, the energy accumulated in the primary coil L336 is being discharged toward the light-emitting module 35. The current I40 flowing through the diode D40 decreases linearly and monotonically (from time T1 to time T2 in section (b) of FIG. 7). During this period, a constant voltage is being generated between the terminals of the primary coil L36, where the first terminal of the primary coil L36, which is connected to the anode of the diode D40, has a higher potential than the second terminal of the primary coil L36. Also, a constant voltage is being generated in the secondary coil L47 having the opposite polarity as the primary coil L36, where the first terminal of the secondary coil L47, which is connected to the terminal at the low-potential side of the rectifying and smoothing circuit 31, has a lower potential than the second terminal of the secondary coil L47. Accordingly, the potential Vb at the node between the resistors R45 and R46 of the voltage output circuit 44 is maintained at a constant value that is higher than the output terminal at the low-potential side of the rectifying and smoothing circuit 31 (from time T1 to time T2 in section (d) of FIG. 7).

Meanwhile, current does not flow through the resistor R538 due to turning off of the transistor 537, and consequently, the potential Ve at the node between the resistors R542 and R543 of the current detector circuit 541 first rises sharply (at time T1 in section (d) of FIG. 7), and is then maintained at a constant value (from time T1 to time T2 in section (d) of FIG. 7). During this period, the potential difference Vbe, which is the difference between the potential Ve at the output terminal of the difference circuit 561 and the potential Vb at the node between the resistors R45 and R46 of the voltage output circuit 44, is maintained at the threshold voltage of the transistor 48 (from time T1 to time T2 in section (e) of FIG. 7). Consequently, the transistor 537 is maintained in the turned-off state (from time T1 to time T2 in section (f) of FIG. 7).

Subsequently, when all the energy accumulated in the primary coil L336 of the transformer TF2 has been discharged, current does not flow through the secondary coil L347 of the transformer TF2, and the potential Vb at the node between the resistors R45 and R46 of the voltage output circuit 44 rises sharply. At this point, the potential difference Vbe, which is the difference between the potential Ve at the output terminal of the difference circuit 561 and the potential Vb at the node between the resistors R45 and R46 of the voltage output circuit 44, becomes smaller than the threshold voltage of the transistor 48. Consequently, the transistor 48 is turned off, and consecutively the transistors 49 and 52 are turned off, and hence the transistor 537 is turned off (at time T2 in section (f) of FIG. 7).

The transistor 537 is repeatedly turned on and off by repeating the above-described operations.

(5) Embodiment above describes an example case where the transistor 48 included in the on-off control circuit 57 is configured as an NPN bipolar transistor and the transistor 49 is configured as a PNP bipolar transistor. However, this is not essential for the present invention.

Figure 8:
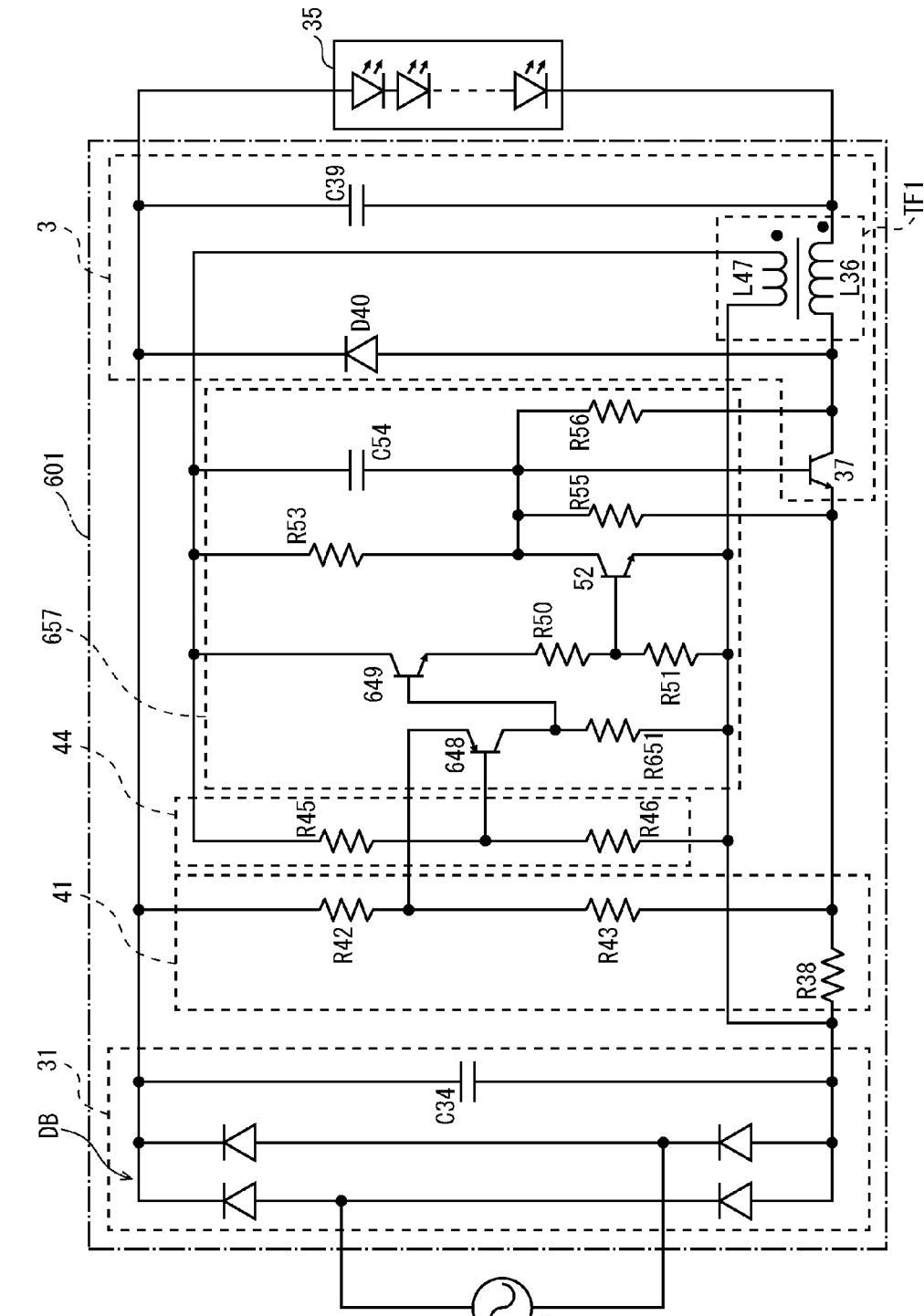
FIG. 8 is a circuit diagram illustrating a power supply circuit pertaining to a modification.

FIG. 8 is a circuit diagram illustrating a power supply circuit 601 pertaining to the present modification. Elements of configuration which are the same as in Embodiment are labeled using the same reference signs and explanation thereof is omitted where appropriate.

As shown in FIG. 8, in the on-off control circuit 657, a transistor 648 is configured as a PNP bipolar transistor, and a transistor 649 is configured as an NPN bipolar transistor. A pull-down resistor R651 is connected between the output terminal at the low-potential side of the rectifying and smoothing circuit 31 and the collector of the transistor 648.

According to the present modification, when the transistor 648 is turned on, current flows through the resistor R651, the base potential of the transistor 649 rises, and the transistor 649 is turned on.

(6) Embodiment above explains that it is possible to change the turned-on period of the transistor 37 by changing the resistance value of the resistor R38 and thereby changing the peak value of the current flowing through the primary coil L36 of the transformer TF1.

The present modification makes use of this fact, and each of the resistors included in the current detector circuit 41 is configured as a variable resistor. Thus, the present modification has a function of changing the turned-on period of the transistor 37 by changing the level of the current flowing through the primary coil L36.

Figure 9:
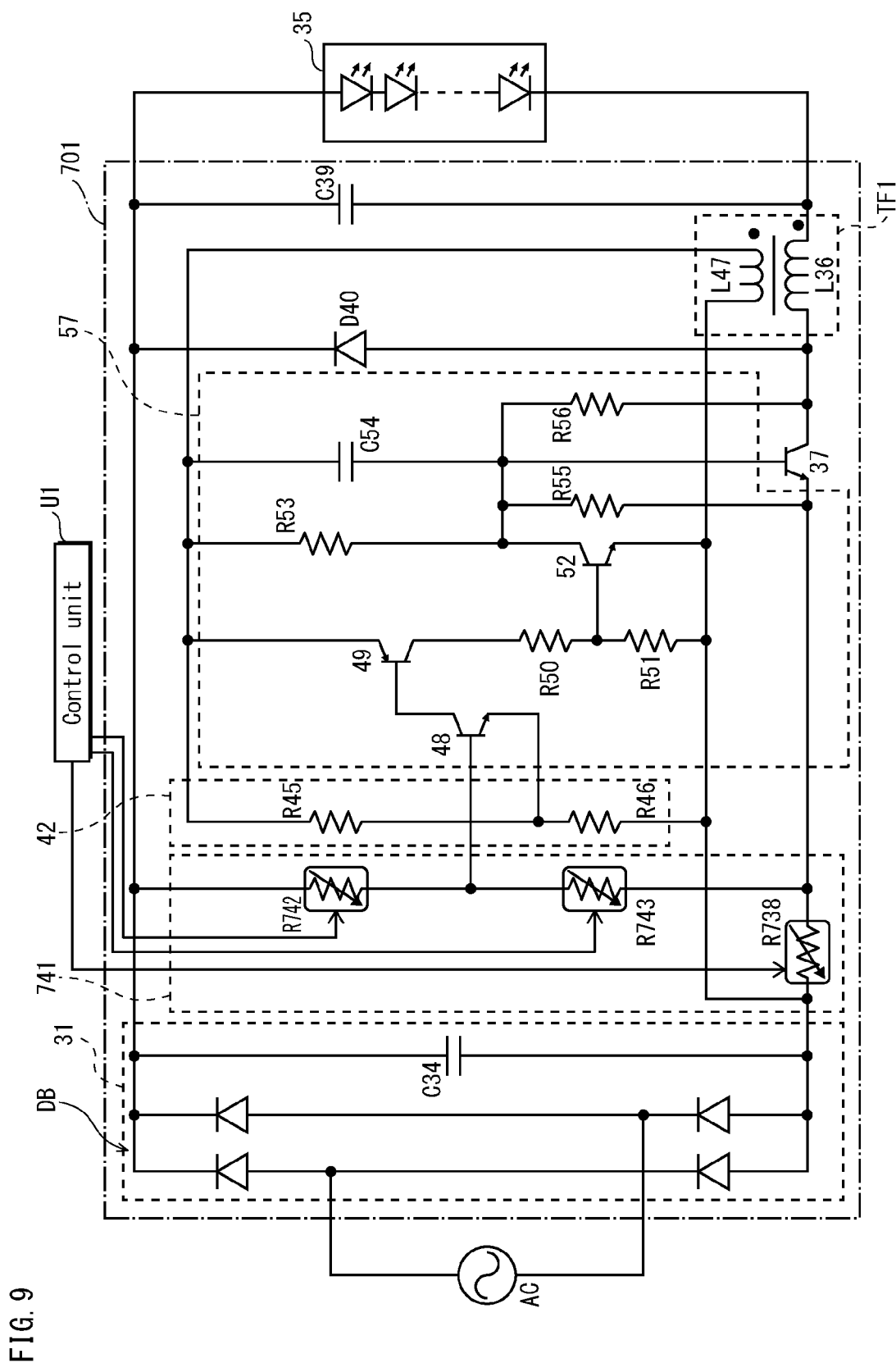
FIG. 9 is a circuit diagram illustrating a power supply circuit pertaining to a modification.

FIG. 9 is a circuit diagram illustrating a power supply circuit 701 pertaining to the present modification.

As shown in FIG. 9, a current detector circuit 741 of the power supply circuit 701 includes variable resistors R738, R742 and R743. The power supply circuit 701 is connected to a control unit U1 that controls the resistance values of the variable resistors R738, R742 and R743.

(7) According to the present modification, the power supply circuit 1 pertaining to Embodiment is modified by increasing the resistance values of the resistors include in each of the current detector circuit 41, the voltage output circuit 44 and the on-off control circuit 57, and thereby reducing the values of current flowing through the current detector circuit 41, the voltage output circuit 44 and the on-off control circuit 57. This configuration reduces power consumption by the current detector circuit 41, the voltage output circuit 44 and the on-off control circuit 57.

Note that if the values of current flowing through the current detector circuit 41, the voltage output circuit 44 and the on-off control circuit 57 are reduced, the influence of the parasitic capacitance of each of the transistors 48, 49 and 52 included in the on-off control circuit 57 becomes not negligible.

Figure 10A:
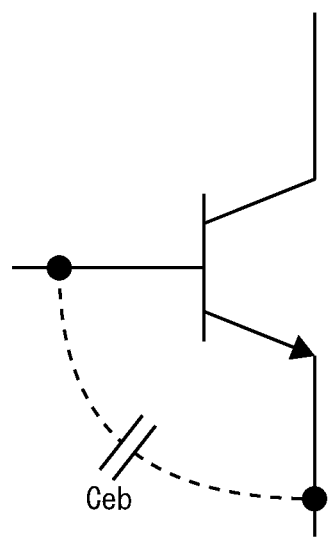
FIGS. 10A and 10B are schematic diagrams provided in order to explain operation of a power supply circuit pertaining to a modification.
Figure 10B:
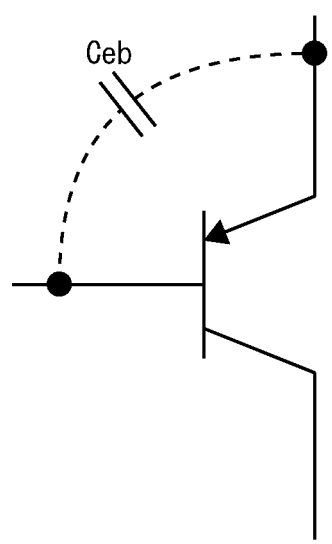

FIGS. 10A and 10B show an equivalent circuit considering the parasitic capacitance of each of the transistors 48, 49 and 52 pertaining to the present modification.

As shown in FIGS. 10A and 10B, each of the transistors 48, 49 and 52 has a parasitic capacitance Ceb between the base and the emitter thereof. Therefore, when the transistor 48 is turned on, the operation of the transistor 49 is delayed until completion of charging of the parasitic capacitance Ceb of the transistor 49. Similarly, when the transistor 49 is turned on, the operation of the transistor 52 is delayed until completion of charging of the parasitic capacitance Ceb of the transistor 52. Furthermore, when the transistor 52 is turned on, the operation of the transistor 37 is delayed until completion of charging of the parasitic capacitance Ceb of the transistor 37.

Figure 11:
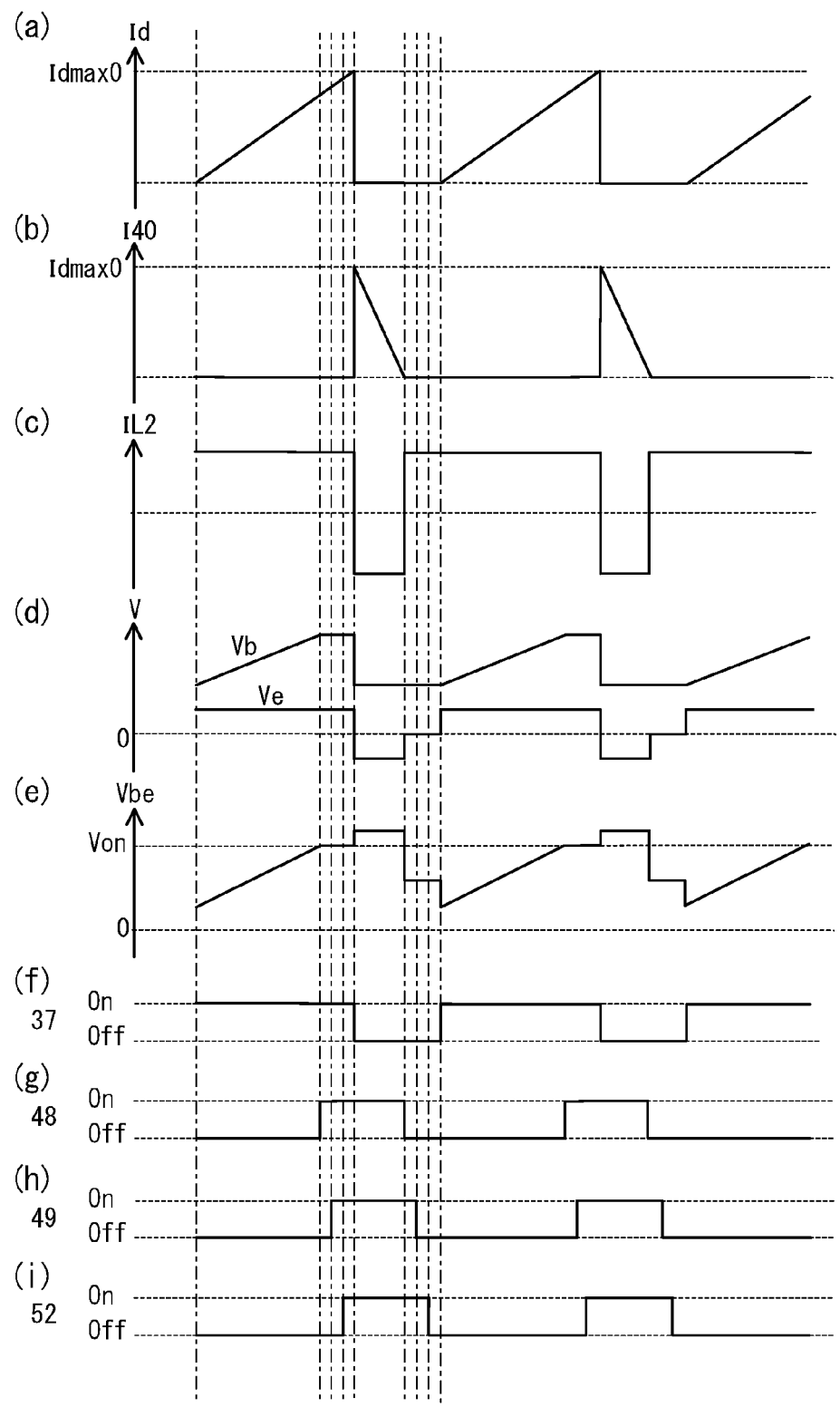
FIG. 11 is a waveform chart provided in order to explain operation of a power supply circuit pertaining to a modification.

FIG. 11 is a waveform chart provided in order to explain operation of a power supply circuit pertaining to the present modification.

As shown in FIG. 11, upon turning on of the transistor 48, the transistor 37 is turned on after the elapse of the respective delay times of the transistors 49, 52 and 37. Upon turning off of the transistor 48, the transistor is turned off after the elapse of the respective delay times of the transistors 49, 52 and 37. Therefore, according to the present modification, it is possible to change the turned-on period of the transistor 37 by changing the respective delay times of the transistors 49, 52 and 37.

Therefore, the present modification allows for changing the values of current flowing through the transistors 49, 52 and 37 by changing the resistance values of the resistors R50, R51, R53, R55 and R56 included in the on-off control circuit 57. Thus, the present modification allows for adjusting the turned-on period of the transistor 37 by changing the respective delay times of the transistors 49, 52 and 37.

(8) Embodiment above described an example configuration in which the voltage conversion circuit 3 is configured as a voltage step-down circuit. However, this is not essential for the present invention. The voltage conversion circuit 3 may be configured as another sort of voltage conversion circuit, such as a voltage step-up and step-down circuit.

Figure 12:
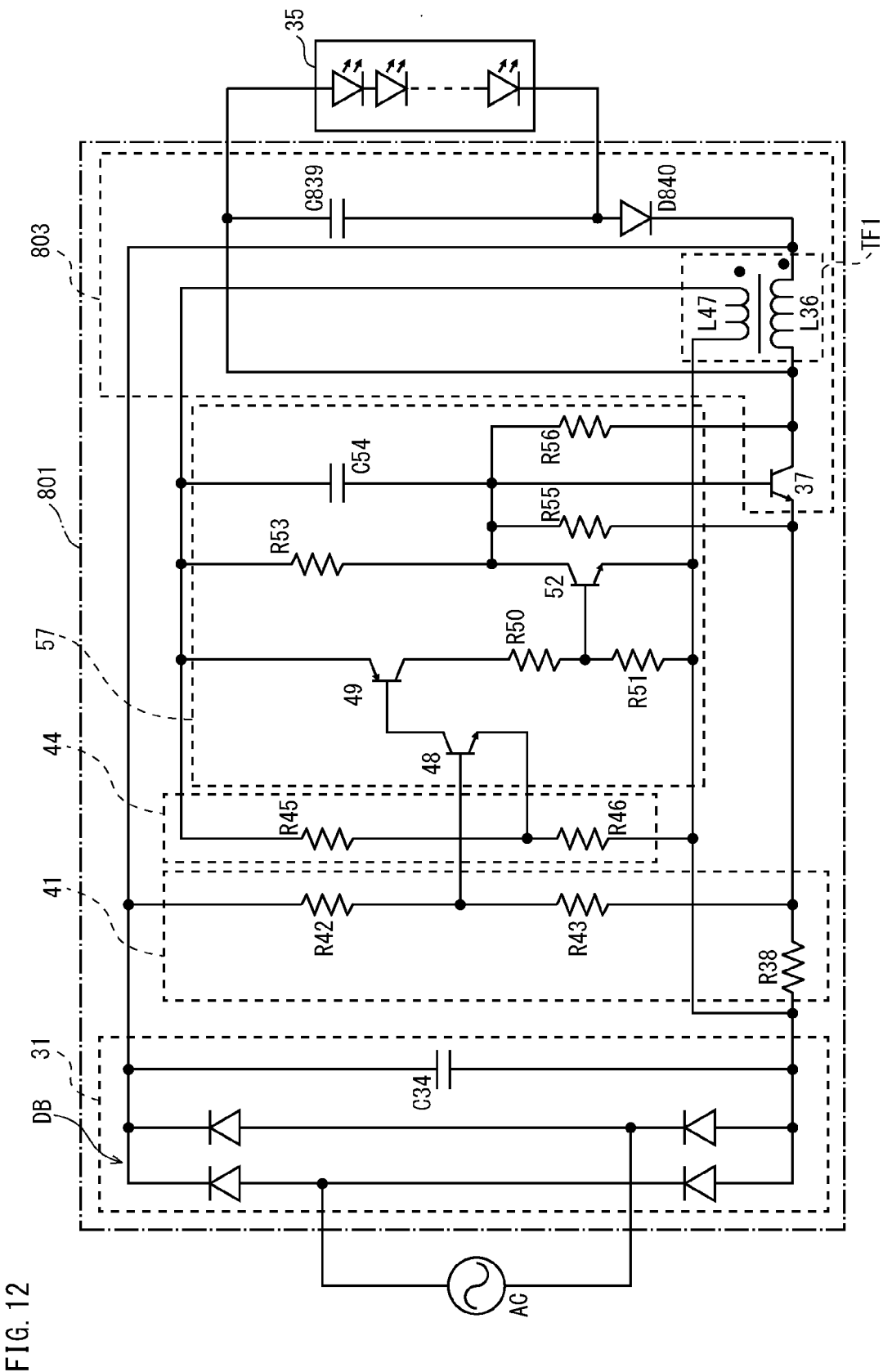
FIG. 12 is a circuit diagram illustrating a power supply circuit pertaining to a modification.

FIG. 12 is a circuit diagram illustrating a power supply circuit 801 pertaining to the present modification. Elements of configuration which are the same as in Embodiment are labeled using the same reference signs and explanation thereof is omitted where appropriate.

As shown in FIG. 12, a voltage conversion circuit 803 of the power supply circuit 801 includes a transformer TF1, a transistor 37, a diode D840, and a capacitor C839. The transistor 37 and the transformer TF1 are the same as in Embodiment.

The anode of the diode D840 is connected to the terminal at the low-potential side of the light-emitting module 35, and the cathode of the diode D840 is connected to the primary coil L36.

The capacitor C839 is connected between: the node between the primary coil L36 and the transistor 37; and the anode of the diode D840.

Thus, the voltage conversion circuit 803 is configured as a voltage step-up and step-down circuit.

When this configuration is adopted, voltage between the terminals of the secondary coil L47 of the transformer TF1 is irrespective of voltage between the terminals of the light-emitting module 35 composed of LEDs, but is proportional to the voltage Vin. When this configuration is adopted, it is impossible to fix the power supplied to the light-emitting module 35 to be constant. However, it is possible to control the input power to fall within a certain range. Voltage between the terminals of the resistor R46 and the sum of voltage between the terminals of the resistor R43 and voltage between the terminals of the resistor R38 are both proportional to the voltage Vin. According to the present modification, Vinxα+VR38 (i.e. voltage between the terminals of the resistor R38) is set to be constant by adjusting, for example, the turns ratio of the transformer TF1.

Figure 13:
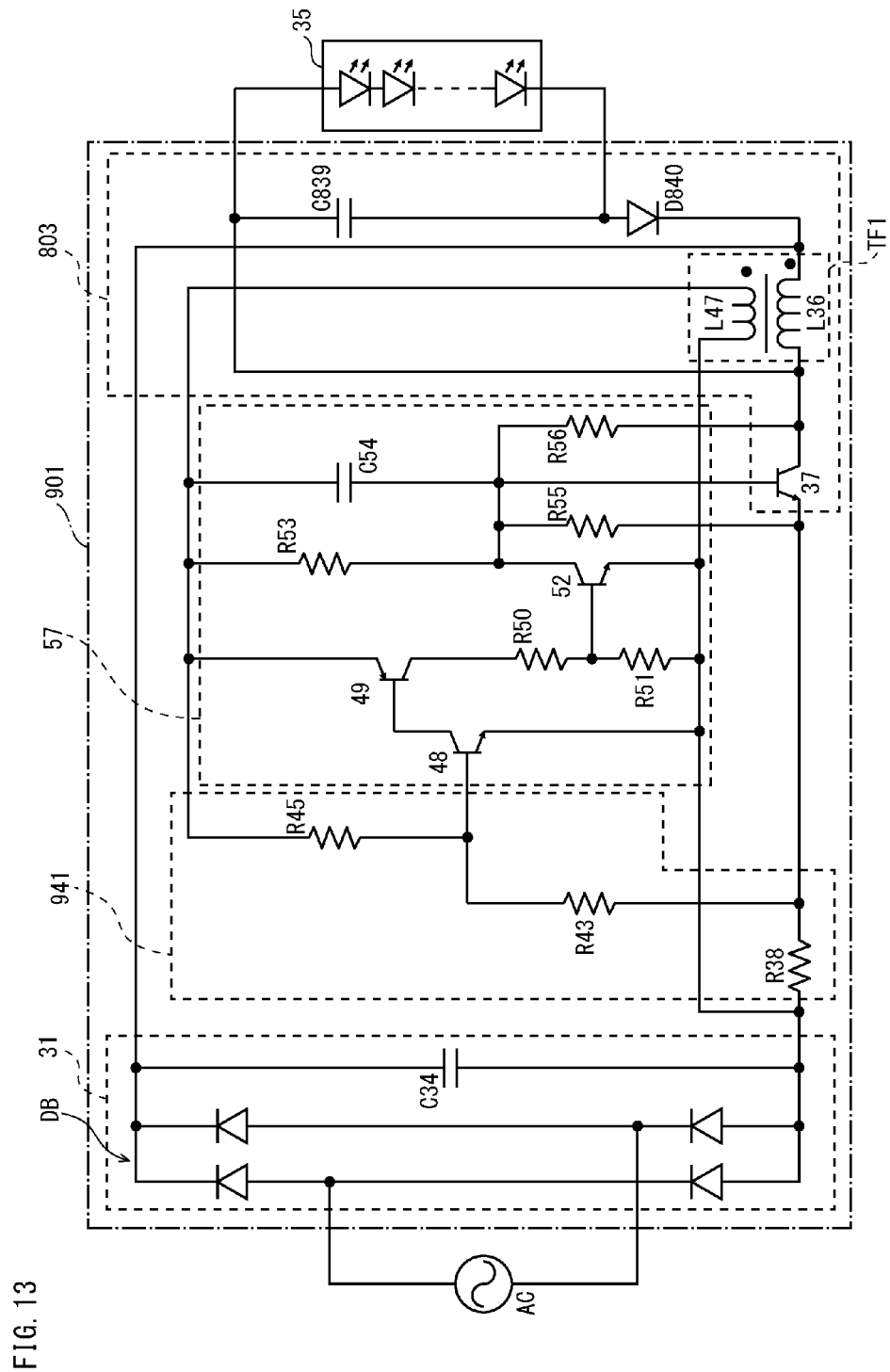
FIG. 13 is a circuit diagram illustrating a power supply circuit pertaining to a modification.

FIG. 13 is a circuit diagram illustrating a power supply circuit 901 pertaining to another modification. Elements of configuration which are the same as in FIG. 12 are labeled using the same reference signs and explanation thereof is omitted where appropriate.

As shown in FIG. 13, the power supply circuit 901 includes a circuit 941 that has both the function of the current detector circuit 41 and the function of the voltage output circuit 44. The circuit 941 applies a voltage obtained by adding the voltage element applied to the secondary coil L47 and the voltage element applied to the resistor R38 to the base voltage of the transistor 48.

This configuration causes less power loss than the power supply circuit 801 configured as shown in FIG. 12, and allows for power stabilization control that controls the input power to the light-emitting module 35 to be within a certain voltage range. The supply power to the light-emitting module 35 composed of LEDs can be obtained by (the input power to the power supply circuit)×(the circuit efficiency of the power supply circuit 901). Therefore, the supply power to the light-emitting module 35 can be substantially constant when the circuit efficiency only varies within a narrow range.

INDUSTRIAL APPLICABILITY

The present invention is commonly applicable to devices that require DC power supply.

REFERENCE SIGNS LIST

1, 201, 301, 401, 501, 601, 701, 801 Power supply circuit
3, 203, 303, 503, 803 Voltage conversion circuit
31 Rectifying and smoothing circuit
35 Light-emitting module
37, 48, 49, 52, 537, 648, 649 Transistor
41, 541, 741 Current detector circuit
44 Voltage output circuit
57, 357, 457, 657 on-off control circuit
455, 566 Operational amplifier
561 Difference circuit
C34, C39, C54, C839 Capacitor
D40, D840 Diode
L36, L336, L536 Primary coil
L47, L347, L547 Secondary coil
L236 Inductor
R38, R42, R43, R45, R46, R50, R51, R53, R55, R56, R451, R452, R453, R454, R456, R531, R532, R538, R542, R543, R562, R563, R564, R565, R651 Resistor
R738 Variable resistor
TF1, TF2 Transformer
U1 Control unit

The invention claimed is:

1. A power supply circuit comprising:
a DC power supply;
a switching element disposed in a current path extending from an output terminal at a high-potential side of the DC power supply to an output terminal at a low-potential side of the DC power supply, via a load;
a transformer including a primary coil disposed in the current path and a secondary coil magnetically coupled with the primary coil;
a current detector circuit detecting current flowing through the switching element, and outputting voltage corresponding to the current thus detected;
a voltage output circuit outputting, when the switching element is turned on, voltage that is dependent on voltage induced by the secondary coil; and
an on-off control circuit turning off the switching element when an absolute value of a difference between the voltage output by the current detector circuit and the voltage output by the voltage output circuit is equal to or greater than a threshold voltage, and turning on the switching element when the absolute value of the difference is smaller than the threshold voltage.

2. The power supply circuit of claim 1, wherein
the transformer has a turns ratio determined based on the voltage to be output by the voltage output circuit.

3. The power supply circuit of claim 1, wherein
the current detector circuit includes:
a first resistor disposed in the current path between the switching element and the output terminal at the low-potential side of the DC power supply; and
a series circuit composed of a second resistor and a third resistor, the second resistor having a terminal connected to the output terminal at the high-potential side of the DC power supply and a terminal connected between the first resistor and the switching element, the current detector circuit outputs voltage between terminals of the third resistor, and the voltage output circuit includes a fourth resistor and a fifth resistor connected between terminals of the secondary coil, and outputs voltage between terminals of the fifth resistor.

4. The power supply circuit of claim 1, wherein
the on-off control circuit includes:
- a two-level voltage output circuit outputting voltage at a first level when the absolute value of the difference is equal to or greater than the threshold voltage, and outputting voltage at a second level when the absolute value of the difference is smaller than the threshold voltage; and
- an on-off control switching element turning off the switching element when the voltage output by the two-level voltage output circuit is at the first level, and turning on the switching element when the voltage output by the two-level voltage output circuit is at the second level.

5. The power supply circuit of claim 4, wherein
the switching element is an NPN bipolar transistor,
the two-level voltage output circuit includes:
- a first transistor being an NPN bipolar transistor and having a base connected to an output terminal of the current detector circuit and an emitter connected to an output terminal of the voltage output circuit;
- a second transistor being a PNP bipolar transistor and having a base connected to a collector of the first transistor and an emitter connected to the secondary coil; and
- a series circuit composed of a sixth resistor and a seventh resistor connected in series between a collector of the second transistor and the output terminal at the low-potential side of the DC power supply, and the on-off control switching element includes a third transistor being an NPN bipolar transistor and having a base connected to a node between the sixth resistor and the seventh resistor, an emitter connected to the output terminal at the low-potential side of the DC power supply, and a collector connected to the secondary coil and a base of the switching element.

6. The power supply circuit of claim 4, wherein
the switching element is an N-channel MOSFET,
the two-level voltage output circuit includes:
- a first transistor being an N-channel MOSFET and having a gate connected to an output terminal of the current detector circuit and a source connected to an output terminal of the voltage output circuit;
- a second transistor being a P-channel MOSFET and having a gate connected to a drain of the first transistor and a source connected to the secondary coil; and
- a series circuit composed of a sixth resistor and a seventh resistor connected in series between a drain of the second transistor and the output terminal at the low-potential side of the DC power supply, and the on-off control switching element includes: a third transistor being an N-channel MOSFET, and having a gate connected to a node between the sixth resistor and the seventh resistor, a source connected to the output terminal at the low-potential side of the DC power supply, and a drain connected to the secondary coil and a gate of the switching element.

7. The power supply circuit of claim 1, wherein
the on-off control circuit includes:
- a difference output circuit outputting voltage that is proportional to the absolute value of the difference; and
- an on-off control switching element turning off the switching element when the voltage proportional to the absolute value of the difference is equal to or greater than the threshold voltage, and turning on the switching element when the voltage proportional to the absolute value of the difference is smaller than the threshold voltage.

\* \* \* \* \*